US012681866B2

(12) United States Patent
Boraten et al.

(10) Patent No.: US 12,681,866 B2
(45) Date of Patent: Jul. 14, 2026

(54) SPECULATIVE CACHE INVALIDATION FOR PROCESSING-IN-MEMORY INSTRUCTIONS

(71) Applicant: Advanced Micro Devices, Inc., Santa Clara, CA (US)

(72) Inventors: Travis Henry Boraten, Austin, TX (US); Jagadish B. Kotra, Austin, TX (US); David Andrew Werner, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/374,951

(22) Filed: Sep. 29, 2023

(65) Prior Publication Data

US 2025/0110886 A1    Apr. 3, 2025

(51) Int. Cl.
G06F 12/0897        (2016.01)
G06F 12/0891        (2016.01)

(52) U.S. Cl.
CPC ...... G06F 12/0897 (2013.01); G06F 12/0891 (2013.01); G06F 2212/1024 (2013.01)

(58) Field of Classification Search
CPC ............. G06F 12/0897; G06F 12/0891; G06F 2212/1024
See application file for complete search history.

(56) References Cited

U.S. PATENT DOCUMENTS

| | | | |
|---|---|---|---|
| 6,263,406 B1 | 7/2001 | Uwano | |
| 6,553,465 B1 | 4/2003 | Takusagawa | |
| 6,944,746 B2 | 9/2005 | So | |
| 7,047,393 B2 | 5/2006 | Paver | |
| 8,359,462 B1 | 1/2013 | Khan et al. | |
| 9,442,854 B2 | 9/2016 | Hyde et al. | |
| 9,575,815 B1 | 2/2017 | Guthrie et al. | |
| 10,061,588 B2 | 8/2018 | Gschwind et al. | |
| 11,594,274 B2 | 2/2023 | Murphy et al. | |
| 11,625,249 B2 | 4/2023 | Kotra et al. | |

(Continued)

OTHER PUBLICATIONS

U.S. Appl. No. 17/136,767 , "Notice of Allowance", U.S. Appl. No. 17/136,767, Apr. 30, 2024, 18 pages.

(Continued)

*Primary Examiner* — Kalpit Parikh
(74) *Attorney, Agent, or Firm* — FIG. 1 Patents

(57) ABSTRACT

Speculative cache invalidation techniques for processing-in-memory instructions are described. In one example, a system includes a cache system including a plurality of cache levels and a cache coherence controller. The cache coherence controller is configured to perform a cache directory lookup using a cache directory. The cache directory lookup is configured to indicate whether data associated with a memory address specified by a processing-in-memory request is valid in memory. The system employs speculative evaluation logic to identify whether the data associated with the processing-in-memory request is stored in the cache system before the processing-in-memory request is transmitted to the cache coherence controller. If the data is stored in the cache system, the cache system locally invalidates or flushes the data to avoid stalling the processing-in-memory request during a cache directory lookup.

20 Claims, 5 Drawing Sheets

(56)                    References Cited

U.S. PATENT DOCUMENTS

| | | | |
|---|---|---|---|
| 11,625,251 B1 | 4/2023 | Agrawal et al. | |
| 11,663,008 B2 | 5/2023 | Lee et al. | |
| 11,782,624 B2 | 10/2023 | Yang et al. | |
| 11,868,777 B2 | 1/2024 | Kalamatianos et al. | |
| 11,921,626 B2 | 3/2024 | Yoon et al. | |
| 12,073,251 B2 | 8/2024 | Challapalle et al. | |
| 12,147,338 B2 | 11/2024 | Kotra et al. | |
| 12,153,926 B2 | 11/2024 | Kalamatianos et al. | |
| 12,160,643 B2 | 12/2024 | Zhou et al. | |
| 2002/0199066 A1* | 12/2002 | Chaudhry | G06F 9/3851 |
| | | | 711/5 |
| 2006/0224835 A1* | 10/2006 | Blumrich | G06F 12/0831 |
| | | | 711/146 |
| 2007/0174685 A1 | 7/2007 | Banks | |
| 2008/0046692 A1 | 2/2008 | Michalak et al. | |
| 2008/0244185 A1 | 10/2008 | O'Krafka et al. | |
| 2008/0307169 A1 | 12/2008 | Averill et al. | |
| 2010/0017649 A1 | 1/2010 | Wu et al. | |
| 2010/0153761 A1 | 6/2010 | Nishioka | |
| 2011/0167222 A1 | 7/2011 | Lee et al. | |
| 2011/0242113 A1 | 10/2011 | Keall et al. | |
| 2012/0179876 A1 | 7/2012 | Guthrie et al. | |
| 2013/0086367 A1 | 4/2013 | Gschwind et al. | |
| 2014/0040551 A1* | 2/2014 | Blainey | G06F 9/3004 |
| | | | 711/E12.024 |
| 2014/0052916 A1* | 2/2014 | Lih | G06F 12/0806 |
| | | | 711/119 |
| 2014/0089572 A1 | 3/2014 | Koka et al. | |
| 2014/0281405 A1 | 9/2014 | Streett et al. | |
| 2016/0092238 A1 | 3/2016 | Codrescu et al. | |
| 2016/0155491 A1 | 6/2016 | Roberts et al. | |
| 2017/0060588 A1 | 3/2017 | Choi | |
| 2017/0123915 A1 | 5/2017 | Nguyen et al. | |
| 2017/0123987 A1 | 5/2017 | Cheng et al. | |
| 2017/0213312 A1 | 7/2017 | Woo et al. | |
| 2017/0262369 A1* | 9/2017 | Murphy | G06F 12/084 |
| 2017/0344480 A1 | 11/2017 | Beard et al. | |
| 2018/0089081 A1 | 3/2018 | Ramalingam | |
| 2018/0188961 A1 | 7/2018 | Venkatesh et al. | |
| 2018/0336035 A1 | 11/2018 | Choi et al. | |
| 2019/0089081 A1 | 3/2019 | Zhang | |
| 2020/0192757 A1 | 6/2020 | Qin et al. | |
| 2020/0218540 A1 | 7/2020 | Kesiraju et al. | |
| 2021/0271680 A1 | 9/2021 | Lee et al. | |
| 2022/0076717 A1 | 3/2022 | Mathew et al. | |
| 2022/0188117 A1 | 6/2022 | Kalamatianos et al. | |
| 2022/0188233 A1* | 6/2022 | Kalamatianos | G06F 12/0828 |
| 2022/0206817 A1 | 6/2022 | Kotra et al. | |
| 2022/0206855 A1 | 6/2022 | Challapalle et al. | |
| 2023/0028952 A1 | 1/2023 | Kim | |
| 2023/0154522 A1 | 5/2023 | Kim et al. | |
| 2023/0244442 A1 | 8/2023 | Lee et al. | |
| 2023/0244492 A1 | 8/2023 | Kotra et al. | |
| 2024/0004653 A1 | 1/2024 | Alsop et al. | |
| 2024/0126552 A1 | 4/2024 | Kalamatianos et al. | |
| 2024/0211393 A1 | 6/2024 | Kotra et al. | |
| 2024/0231645 A1 | 7/2024 | Zhang et al. | |
| 2025/0110887 A1 | 4/2025 | Werner et al. | |

OTHER PUBLICATIONS

U.S. Appl. No. 17/473,242 , "Non-Final Office Action", U.S. Appl. No. 17/473,242, Mar. 7, 2024, 16 pages.

U.S. Appl. No. 17/853,613 , "Non-Final Office Action", U.S. Appl. No. 17/853,613, Apr. 25, 2024, 9 pages.

U.S. Appl. No. 18/146,509 , "Non-Final Office Action", U.S. Appl. No. 18/146,509, Apr. 3, 2024, 11 pages.

Nai, Lifeng , et al., "GraphPIM: Enabling Instruction-Level PIM Offloading in Graph Computing Frameworks", 2017 IEEE International Symposium on High Performance Computer Architecture (HPCA), Feb. 2017, 12 pages.

Xu, Sheng , et al., "TUPIM: A Transparent and Universal Processing-in-Memory Architecture for Unmodified Binaries", GLSVLSI '20:

Proceedings of the 2020 on Great Lakes Symposium on VLSI, Sep. 2020, 6 pages.

U.S. Appl. No. 18/146,509 , "Notice of Allowance", U.S. Appl. No. 18/146,509, Aug. 27, 2024, 6 pages.

U.S. Appl. No. 18/298,723 , "Non-Final Office Action", U.S. Appl. No. 18/298,723, Jun. 20, 2024, 9 pages.

U.S. Appl. No. 18/393,657 , "Notice of Allowance", U.S. Appl. No. 18/393,657, Jul. 31, 2024, 9 pages.

"ARM946E-S Technical Reference Manual r1p1", Arm Developer [retrieved May 17, 2023]. Retrieved from the Internet <https://developer.arm.com/documentation/ddi0201/d/programmer-s-model/cp15-register-map-summary/register-7--cache-operations-register>., 6 Pages.

"Google Project Zero", GitHub Inc., Uplaoded by Projects by Google Project Zero [retrieved Sep. 15, 2022]. Retrieved from the Internet <https://github.com/googleprojectzero>., 3 Pages.

"HPCA 2021", The 27th IEEE International Symposium on High-Performance Computer Architecture (HPCA-27), Seoul, South Korea [retrieved Sep. 15, 2022]. Retrieved from the Internet <https://hpca-conf.org/2021/keynotes/>., Mar. 2021, 3 Pages.

U.S. Appl. No. 17/123,270, , "Final Office Action", U.S. Appl. No. 17/123,270, Nov. 23, 2021, 15 pages.

U.S. Appl. No. 17/123,270, , "Non-Final Office Action", U.S. Appl. No. 17/123,270, Aug. 4, 2021, 14 pages.

U.S. Appl. No. 17/123,270, , "Notice of Allowance", U.S. Appl. No. 17/123,270, Sep. 7, 2023, 7 pages.

U.S. Appl. No. 17/123,270, , "Notice of Allowance", U.S. Appl. No. 17/123,270, Nov. 10, 2022, 7 pages.

U.S. Appl. No. 17/137,140, , "Final Office Action", U.S. Appl. No. 17/137,140, Aug. 15, 2022, 8 pages.

U.S. Appl. No. 17/137,140, , "Non-Final Office Action", U.S. Appl. No. 17/137,140, Mar. 9, 2022, 8 pages.

U.S. Appl. No. 17/137,140, , "Notice of Allowance", U.S. Appl. No. 17/137,140, Dec. 8, 2022, 8 pages.

Agrawal, Varun et al., "Pursuant to MPEP § 2001.06(b) the applicant brings the following co-pending application to the Examiner's attention:", U.S. Appl. No. 17/561,112, filed Dec. 23, 2021, 25 pages.

Alsop, Jonathan et al., "Pursuant to MPEP § 2001.06(b) the applicant brings the following co-pending application to the Examiner's attention:", U.S. Appl. No. 17/853,613, filed Jun. 29, 2022, 28 pages.

Aweke, Zelalem B. et al., "ANVIL: Software-Based Protection Against Next-Generation Rowhammer Attacks", ACM SIGPLAN Notices, vol. 51, No. 4 [retrieved Sep.1 5, 2022]. Retrieved from the Internet <http://www.seclab.cs.stonybrook.edu/seclab/pubs/ANVIL.pdf>., Mar. 25, 2016, 13 Pages.

Boraten, Travis H. et al., "Pursuant to MPEP § 2001.06(b) the applicant brings the following co-pending application to the Examiner's attention:", U.S. Appl. No. 18/192,925, filed Mar. 30, 2023, 48 pages.

Boraten, Travis H. et al., "Pursuant to MPEP § 2001.06(b) the applicant brings the following co-pending application to the Examiner's attention:", U.S. Appl. No. 18/374,969, filed Sep. 29, 2023, 51 pages.

Boraten, Travis H. , "Pursuant to MPEP § 2001.06(b) the applicant brings the following co-pending application to the Examiner's attention:", U.S. Appl. No. 18/146,904, filed Dec. 27, 2022, 53 pages.

Boyer, Michael W. et al., "Pursuant to MPEP § 2001.06(b) the applicant brings the following co-pending application to the Examiner's attention:", U.S. Appl. No. 17/719,225, filed Apr. 12, 2022, 32 pages.

Brasser, Ferdinand et al., "CAn't touch this: software-only mitigation against rowhammer attacks targeting kernel memory", Proceedings of the 26th USENIX Conference on Security Symposium [retrieved Sep. 15, 2022]. Retrieved from the Internet <https://www.usenix.org/system/files/conference/usenixsecurity17/sec17-brasser.pdf>., Aug. 16, 2017, 15 Pages.

Cantin, J.F. et al., "Coarse-Grain Coherence Tracking: RegionScout and Region Coherence Arrays", IEEE Micro, vol. 26, No. 1 [retrieved Oct. 16, 2022]. Retrieved from the Internet <https://pharm.ece.wisc.edu/papers/ieeemicro2005.pdf>., Oct. 11, 2022, 10 Pages.

(56)                    References Cited

OTHER PUBLICATIONS

Gulur, Nagendra Dwarakanath et al., "Multiple sub-row buffers in DRAM: unlocking performance and energy improvement opportunities", Proceedings of the 26th ACM international conference on Supercomputing [retrieved Sep. 15, 2022]. Retrieved from the Internet <https://csrl.cse.unt.edu/sites/default/files/publications/p257-gulur.pdf>., Jun. 25, 2012, 10 Pages.
Hassan, Hasan et al., "Uncovering In-DRAM RowHammer Protection Mechanisms:A New Methodology, Custom RowHammer Patterns, and Implications", 54th Annual IEEE/ACM International Symposium on Microarchitecture [retrieved Sep. 15, 2022]. Retrieved from the Internet <https://arxiv.org/pdf/2110.10603.pdf>., Oct. 17, 2021, 16 Pages.
Jin, Xingyu et al., "Project Zero", News and updates from the Project Zero team at Google [retrieved Sep. 15, 2022]. Retrieved from the Internet <https://googleprojectzero.blogspot.com/>., Aug. 10, 2022, 15 Pages.
Kim, Jeremie S. et al., "Revisiting RowHammer: An Experimental Analysis of Modern DRAM Devices and Mitigation Techniques", Cornell University arXiv, arXiv.org [retrieved Sep. 15, 2022]. Retrieved from the Internet <https://arxiv.org/pdf/2005.13121. pdf>., May 29, 2020, 15 Pages.
Kim, Nam Sung , "A Journey to a Commercial-Grade Function-In-Memory (FIM) Chip Development", HPCA-2021, Keynote [retrieved May 10, 2023]. Retrieved from the Internet <https://hpca-conf.org/2021/keynotes/>., Mar. 3, 2021, 3 Pages.
Kim, Yoongu et al., "A case for exploiting subarray-level parallelism (SALP) in DRAM", 2012 39th Annual International Symposium on Computer Architecture (ISCA) [retrieved Sep. 15, 2022]. Retrieved from the Internet <https://www.pdl.cmu.edu/PDL-FTP/NVM/ISCA39_SALP.pdf>., Sep. 2012, 12 Pages.
Kim, Yoongu et al., "Flipping bits in memory without accessing them: an experimental study of DRAM disturbance errors", ACM SIGARCH Computer Architecture News, vol. 42, No. 3 [retrieved Sep. 15, 2022]. Retrieved from the Internet <https://people.cs.pitt.edu/~znati/Courses/cs2001/2001pprs/row-hammering.pdf>., Jun. 14, 2014, 12 Pages.
Konoth, Radhesh Krishnan , "ZebRAM: Comprehensive and Compatible Software Protection Against Rowhammer Attacks", 13th USENIX Symposium on Operating Systems Design and Implementation [retrieved Sep. 15, 2022]. Retrieved from the Internet <https://www.usenix.net/system/files/osdi18-konoth.pdf>., Oct. 2018, 15 Pages.
Kotra, Jagadish B. et al., "Pursuant to MPEP § 2001.06(b) the applicant brings the following co-pending application to the Examiner's attention:", U.S. Appl. No. 18/146,509, filed Dec. 27, 2022, 48 pages.
Lee, Chulki et al., "DRAM Row hammer micro-benchmark", GitHub, Inc. Uploaded by rowhammer-test [retrieved Sep. 15, 2022]. Retrieved from the Internet <https://github.com/google/rowhammer-test>., 3 Pages.
Lee, Eojin et al., "TWiCe: preventing row-hammering by exploiting time window counters", Proceedings of the 46th International Symposium on Computer Architecture [retrieved Sep. 15, 2022]. Retrieved from the Internet <https://cpb-us-w2.wpmucdn.com/sites.coecis.cornell.edu/dist/7/89/files/2019/06/isca19-334.pdf>., Jun. 22, 2019, 12 Pages.
Orosa, Lois et al., "A Deeper Look into RowHammer's Sensitivities: Experimental Analysis of Real DRAM Chips and Implications on Future Attacks and Defenses", Cornell University arXiv, arXiv. org [retrieved Sep. 15, 2022]. Retrieved from the Internet <https://arxiv.org/pdf/2110.10291.pdf>., Oct. 19, 2021, 17 Pages.
Qureshi, Moinuddin et al., "Hydra: enabling low-overhead mitigation of row-hammer at ultra-low thresholds via hybrid tracking", Proceedings of the 49th Annual International Symposium on Computer Architecture [retrieved Sep. 15, 2022]. Retrieved from the Internet <https://memlab.ece.gatech.edu/papers/ISCA_2022_1. pdf>., Jun. 11, 2022, 12 Pages.
Saileshwar, Gururaj , "Randomized row-swap: mitigating Row Hammer by breaking spatial correlation between aggressor and victim rows", Proceedings of the 27th ACM International Conference on Architectural Support for Programming Languages and Operating Systems [retrieved Sep. 15, 2022]. Retrieved from the Internet <https://gururaj-s.github.io/assets/pdf/ASPLOS22_Saileshwar. pdf>., Feb. 28, 2022, 14 Pages.
Werner, David A. et al., "Pursuant to MPEP § 2001.06(b) the applicant brings the following co-pending application to the Examiner's attention:", U.S. Appl. No. 18/375,018, filed Sep. 29, 2023, 54 pages.
Yağlikçi, Giray A. et al., "BlockHammer: Preventing RowHammer at Low Cost by Blacklisting Rapidly-Accessed DRAM Rows", Cornell University arXiv, arXiv.org [retrieved Sep. 15, 2022]. Retrieved from the Internet <https://arxiv.org/pdf/2102.05981. pdf>., Feb. 11, 2021, 15 Pages.
U.S. Appl. No. 17/136,767 , "Non-Final Office Action", U.S. Appl. No. 17/136,767, Dec. 20, 2023, 20 pages.
U.S. Appl. No. 17/853,613 , "Final Office Action", U.S. Appl. No. 17/853,613, Dec. 22, 2023, 5 pages.
U.S. Appl. No. 17/853,613 , "Non-Final Office Action", U.S. Appl. No. 17/853,613, May 16, 2023, 8 pages.
Ahn, Junwhan , et al., "PIM-enabled instructions: a low-overhead, locality-aware processing-in-memory architecture", ACM SIGARCH Computer Architecture News, vol. 43, No. 3S [retrieved Jan. 12, 2024]. Retrieved from the Internet <https://doi.org/10.1145/2872887. 2750385>, Jun. 13, 2015, 13 pages.
Byoung-Hak, Kim , et al., "Exploration of a PIM Design Configuration for Energy-Efficient Task Offloading", 2019 IEEE International Symposium on Circuits and Systems (ISCAS) [retrieved Jan. 12, 2024]. Retrieved from the Internet <https://doi.org/10.1109/ISCAS.2019.8702339>, May 2019, 4 pages.
Ghose, S , et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 1 of 2, Aug. 8, 2019, 19 pages.
Ghose, S , et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 2 of 2, Aug. 8, 2019, 19 pages.
Giannoula, Christina , et al., "SynCron: Efficient Synchronization Support for Near-Data-Processing Architectures", Cornell University, arXiv Preprint, arxiv.org [retrieved Jan. 12, 2024]. Retrieved from the Internet <https://arxiv.org/pdf/2101.07557.pdf> 1 of 2, Jan. 19, 2021, 14 pages.
Giannoula, Christina , et al., "SynCron: Efficient Synchronization Support for Near-Data-Processing Architectures", Cornell University, arXiv Preprint, arxiv.org [retrieved Jan. 12, 2024]. Retrieved from the Internet <https://arxiv.org/pdf/2101.07557.pdf> 2 of 2, Jan. 19, 2021, 14 pages.
Lee, Won Jun , et al., "Design of Processing-"Inside"-Memory Optimized for DRAM Behaviors", IEEE Access, vol. 7 [retrieved Jan. 12, 2024]. Retrieved from the Internet <https://doi.org/10.1109/ACCESS.2019.2924240>, Jun. 21, 2019, 16 pages.
Pattnaik, Ashutosh , et al., "Scheduling techniques for GPU architectures with processing-in-memory capabilities", PACT '16: Proceedings of the 2016 International Conference on Parallel Architectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.
U.S. Appl. No. 17/473,242 , "Final Office Action", U.S. Appl. No. 17/473,242, Oct. 22, 2024, 13 pages.
U.S. Appl. No. 17/853,613 , "Final Office Action", U.S. Appl. No. 17/853,613, Oct. 1, 2024, 7 pages.
U.S. Appl. No. 18/146,509 , "Corrected Notice of Allowability", U.S. Appl. No. 18/146,509, Oct. 23, 2024, 2 pages.
U.S. Appl. No. 18/298,723 , "Final Office Action", U.S. Appl. No. 18/298,723, Oct. 11, 2024, 7 pages.
U.S. Appl. No. 18/375,018 , "Non-Final Office Action", U.S. Appl. No. 18/375,018, Oct. 9, 2024, 11 pages.
"Notice of Allowance", U.S. Appl. No. 17/853,613, Apr. 1, 2025, 6 pages.

(56) References Cited

OTHER PUBLICATIONS

"Non-Final Office Action", U.S. Appl. No. 18/298,723, Mar. 19, 2025, 9 pages.

"Final Office Action", U.S. Appl. No. 18/375,018, Apr. 15, 2025, 13 pages.

"Non-Final Office Action", U.S. Appl. No. 17/473,242, Jun. 24, 2025, 15 pages.

"Notice Of Allowance", U.S. Appl. No. 18/298,723, Aug. 13, 2025, 8 pages.

"Non-Final Office Action", U.S. Appl. No. 18/375,018, Sep. 10, 2025, 8 pages.

Corrected Notice of Allowability issued in U.S. Appl. No. 18/375,018, mailed Jan. 21, 2026, 2 pages.

Corrected Notice of Allowability issued in U.S. Appl. No. 18/375,018, mailed Mar. 10, 2026, 2 pages.

Final Office Action issued in U.S. Appl. No. 18/192,925, mailed Jan. 27, 2026, 25 pages.

Notice of Allowance issued in U.S. Appl. No. 18/375,018, mailed Jan. 6, 2026, 7 pages.

Non-Final Office Action issued in U.S. Appl. No. 18/192,925, mailed Apr. 22, 2026, 25 pages.

* cited by examiner

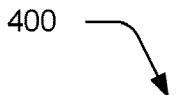

400

402
Receive a processing-in-memory request identifying a memory address

404
Perform a lookup in a cache tag table based on the memory address

406
Generate an invalidation locally at a cache system in response to the cache tag table indicating that data associated with the memory address is stored in the cache system

408
Forward the processing-in-memory request to a cache directory

410
Execute the processing-in-memory request using a processing-in-memory component

FIG. 4

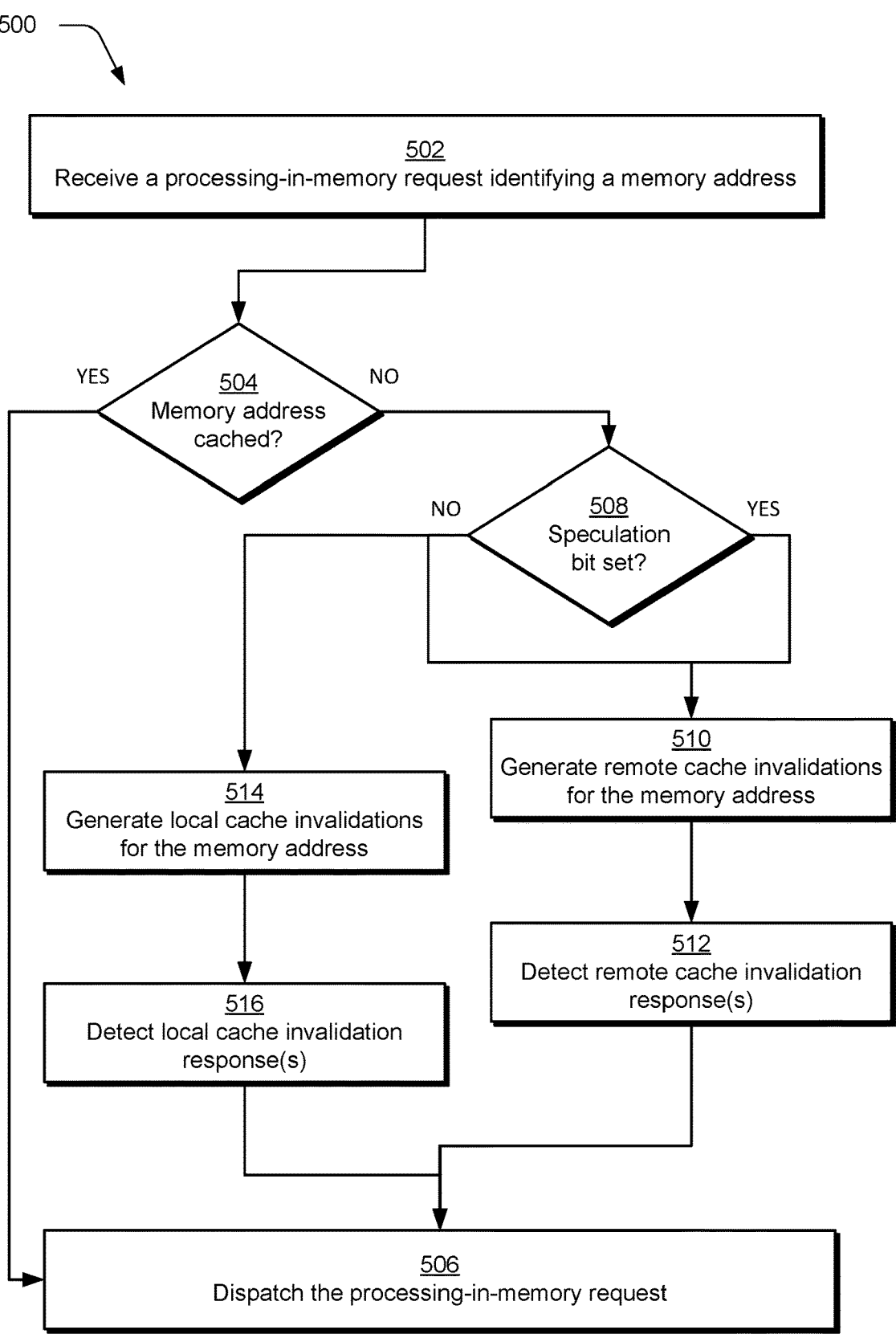

500

502
Receive a processing-in-memory request identifying a memory address

504
Memory address cached?

YES     NO

508
Speculation bit set?

NO     YES

510
Generate remote cache invalidations for the memory address

514
Generate local cache invalidations for the memory address

512
Detect remote cache invalidation response(s)

516
Detect local cache invalidation response(s)

506
Dispatch the processing-in-memory request

FIG. 5

SPECULATIVE CACHE INVALIDATION FOR PROCESSING-IN-MEMORY INSTRUCTIONS

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than processing-in-memory components.

As a result, these conventional computer architectures suffer from increased data transfer latency, which can decrease overall computer performance and increase energy cost. Further, due to the proximity to memory, PIM architectures can also provision higher memory bandwidth and reduced memory access energy relative to conventional computer architectures particularly when the volume of data transferred between the memory and the remote processing unit is large. Thus, processing-in-memory architectures enable increased energy efficiency (e.g., performance per Joule) while reducing data transfer latency as compared to conventional computer architectures that implement remote processing hardware.

BRIEF DESCRIPTION OF THE DRAWINGS

FIG. 4 is a block diagram of a non-limiting example procedure describing performance of a speculative cache invalidation for a processing-in-memory request.

FIG. 5 is a block diagram of a non-limiting example procedure describing performance of a cache directory dispatching a processing-in-memory request based on an indication of whether a speculative cache invalidation is performed for the processing-in-memory request.

DETAILED DESCRIPTION

Overview

Figure 1:
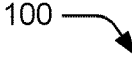
FIG. 1 is a block diagram of a non-limiting example system having a device that implements a processing unit and memory module to implement speculative cache invalidation techniques for processing-in-memory instructions.
Figure 1:
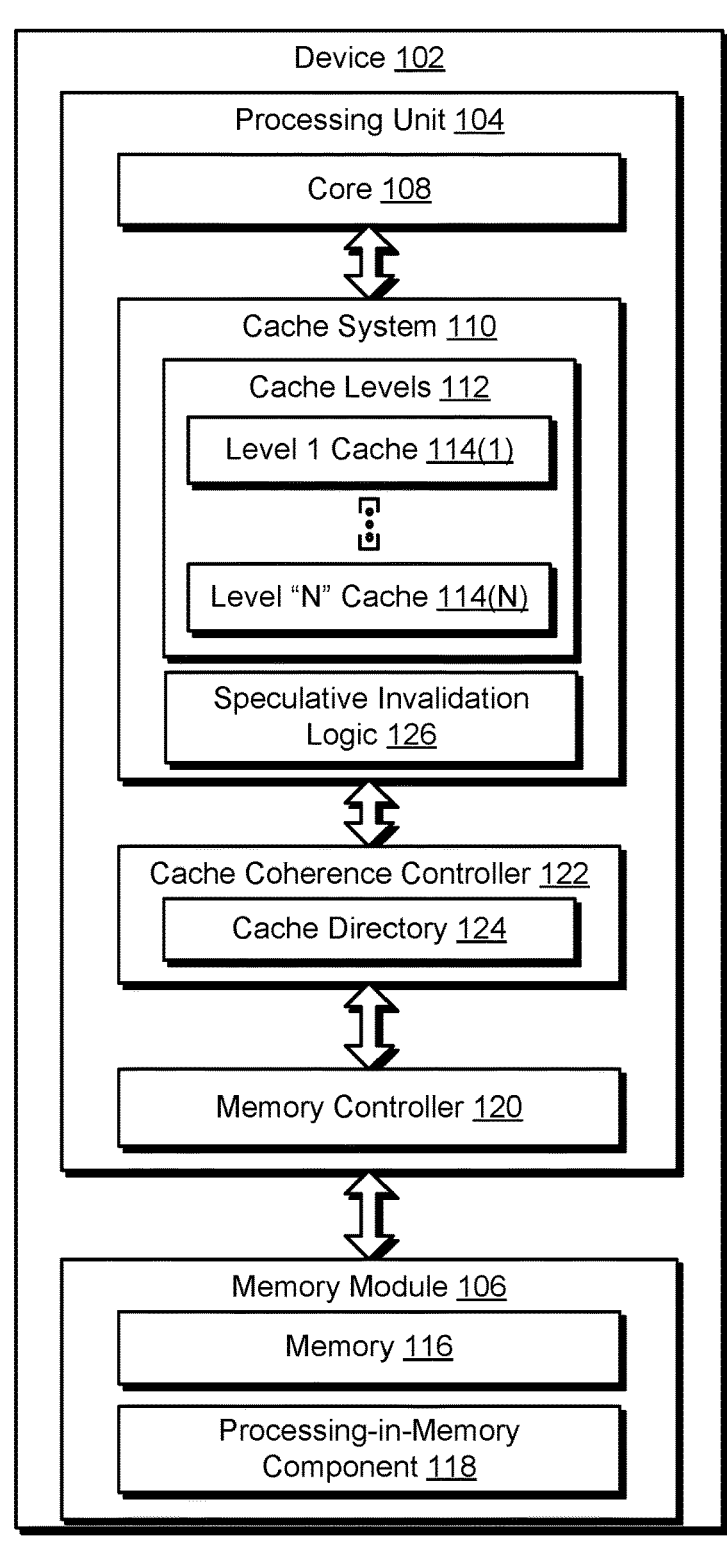

Processing-in-memory (PIM) incorporates processing capability within memory modules so that tasks are processed directly within the memory modules. Processing-in-memory (PIM) techniques also refer to incorporation of processing capability near memory modules so that tasks are also processed without costly round-trip transmission to host processors or other distant computing units. To do so, processing-in-memory leverages techniques are configurable to trigger local computations at multiple memory modules in parallel without involving data movement across a memory module interface, which improves performance, especially for data-intensive workloads such as machine learning.

One of the technical problems of offloading computations to memory (e.g., using PIM techniques) is to ensure that data that is a subject of a memory request is valid in memory (e.g., for use as part of a processing-in-memory operation). A device, for instance, is configurable to include a plurality of cores and associated cache systems as well as memory included in the memory modules (e.g., as dynamic random-access memory (DRAM)).

In order to ensure data validity such that a processing-in-memory operation is performed using "valid" data, a cache coherence controller implements cache directory lookups to query a cache directory. The cache directory maintains cache directory entries that reference memory addresses maintained in respective cache levels of the cache system (e.g., a location of a respective memory address and a status of the respective memory address). The cache directory entries also reference whether data at those memory addresses is "clean" or "dirty" as being unchanged or changed with respect to versions of that data maintained in memory. In other words, the cache directory lookup indicates whether data maintained in the memory has a corresponding version in the cache system and whether that version is changed in the cache system with respect to the memory.

If the data in the memory is not valid in memory for execution of a processing-in-memory instruction (meaning that the data in the cache system is more recent) the cache coherence controller transmits a cache request to the cache system. This causes the cache system to transmit a cache response to the memory such that the data in the memory is subsequently valid for computation by the processing-in-memory component. This is performable, for instance, by leveraging the cache request to cause the cache system to write the data back to memory (e.g., "flush" the data) and/or invalidate the data in the cache system. The cache coherence controller then releases the memory request to the processing-in-memory component for processing (e.g., via a memory controller for performance as part of a processing-in-memory operation).

For example, if a cache system stores "dirty" data for a memory address associated with a memory request, the dirty data is first flushed from the cache system to memory to ensure that the memory request and corresponding processing-in-memory operation is performed using a most recent version of the data. If the cache system stores clean data for the memory request, the clean data is invalidated at the cache system (e.g., through another cache request). This is performed by the cache coherence controller to ensure that subsequent memory requests retrieve the data from memory instead of using stale data from the cache system. This "round trip" in each instance involving the cache coherence controller, the cache system, and memory causes memory requests in conventional systems to stall at the cache directory while waiting for the cached data to be evicted and written back as part of a cache response to memory or invalidated. This results in computational inefficiencies, increased power consumption, and delays.

To overcome these shortcomings facing conventional systems, speculative cache invalidation techniques for processing-in-memory instructions are described. The described techniques involve leveraging tag information stored in one or more caches of a cache hierarchy (e.g., a tag table of a Level Three (L3) cache in a three-level cache hierarchy). As described herein, a cache hierarchy refers to a tiered system of data storage within a computing system architecture that is designed to provide fast and efficient access to data, where different levels of the cache hierarchy represent different sizes, speeds, and proximities to a processing unit (e.g., a central processing unit) of the computing system.

For instance, in a three-level cache hierarchy, the cache system includes L1, L2, and L3 caches (e.g., level one, level two, and level three caches). In such a cache hierarchy, the L1 cache represents the smallest cache memory (e.g., 8 KB to 64 KB) and offers the fastest data access among the cache levels. Architecturally, the L1 cache is located inside or close to a processor core, allowing for ultra-fast data access. In situations where a processor core requires data to execute an instruction, the processor core first checks the L1 cache for the required data.

The L2 cache of such a three-level cache hierarchy is typically larger than the L1 cache (e.g., 256 KB to 2 MB), but has a trade-off of slower data access relative to the L1 cache. The L2 cache is checked by the processor core for required data after checking the L1 cache (e.g., in response to a cache miss at the L1 cache). Continuing this example three-level cache hierarchy, the L3 cache represents the largest cache memory segment (e.g., several MB and beyond), and offers the slowest data access among the cache levels. In many implementations, the L3 cache provides shared data access for multiple cores of a processor. In situations where required data is not found in the L1 or L2 caches, the processor core checks the L3 cache. If the required data is not found in the L3 cache, the processor core retrieves the required data from main memory, which involves increased data access latency. Although described above in context of a three-level hierarchy, the techniques described herein are extendable to any suitable cache system configuration, as described in further detail below with respect to FIG. 2.

In implementations, one or more levels of a cache system include a tag table or other data structure that stores cache tag information. As described herein, a cache tag table refers to a portion of cache memory that stores metadata describing data stored in one or more levels of the cache system. For instance, a cache table stores metadata describing an address of data as stored in main memory and an indication of whether a requested data element is stored in a cache (e.g., is a cache hit) or not (e.g., is a cache miss). Cache tags in a lower-level cache (e.g., the L3 cache), as described herein, refer to indications of whether a given data element or set of data elements is associated with a cache hit anywhere in the cache hierarchy (e.g., in the L1 cache, the L2 cache, and/or the L3 cache).

The techniques described herein employ a speculation logic that first checks a cache tag table to identify whether there is a tag indicating a cache hit for one or more data elements involved in executing a processing-in-memory request, before the processing-in-memory request arrives at a cache directory. In some implementations, the tag table is maintained at a lowest-level cache in the cache hierarchy, which includes information describing whether the requested data is stored in the lowest-level cache (e.g., the L3 cache) as well as any upper-level caches (e.g., the L1 or L2 caches). In response to identifying a cache hit based on the cache tag table, an invalidation for the requested data is generated locally at the cache system, which causes the requested data element(s) to be flushed to main memory before the processing-in-memory request arrives at the cache directory (e.g., before forwarding to a memory controller for scheduling execution of the processing-in-memory request by a processing-in-memory component).

In some implementations, the speculation logic causes local invalidation (e.g., at a cache system level) of data elements that are involved with executing a processing-in-memory request. Alternatively, in other implementations the speculation logic causes local invalidation of data elements that are involved with executing the processing-in-memory request along with one or more additional data elements that are not involved in executing the processing-in-memory request. In such implementations where additional data elements are invalidated locally at the cache system level, the speculation logic identifies that there is a high probability that one or more subsequent processing-in-memory requests involve the additional data elements, due to memory layout configurations.

A single processing-in-memory operation, for instance, is configurable to execute a same operation (i.e., instruction) at a row and column specified in a memory request for each of a plurality of memory banks in memory. To reduce an overhead of opening new rows in memory, processing-in-memory operations are configurable to leverage spatial locality and issue a subsequent memory request to the same rows. Techniques used to perform memory address interleaving, for instance, are usable to place multiple blocks of adjacent data in a same row in memory. Typically, processing-in-memory operations are employed in real-world scenarios for large data structures that cover entire rows in the memory banks, and potentially several rows. Therefore, if a processing-in-memory operation operates using a particular row and column in a memory bank, a subsequent processing-in-memory operation is likely to involve access to other columns in the same row activations.

In this manner, the speculation logic is configured to proactively invalidate these additional data elements and improve system performance (e.g., avoid delay caused by invalidating the additional data elements after issuance of the one or more subsequent processing-in-memory requests).

In accordance with the techniques described herein, processing-in-memory requests dispatched (e.g., by a processor core for execution by a processing-in-memory component) are configured with an indication (e.g., a binary speculation bit) that specifies whether the processing-in-memory request triggers the speculation logic before arrival at a cache directory. As an example, consider a scenario where a cache directory receives a processing-in-memory request, to be scheduled for execution by a processing-in-memory component, with an indication that speculative invalidation was performed at a cache system. In response to determining that speculative invalidation was performed at a cache system for the processing-in-memory request, the cache directory avoids performing cache directory lookups in the cache system for data elements involved in executing the processing-in-memory request, thus avoiding computational delays and energy consumption requirements of conventional systems. In this manner, when speculation logic is triggered for a processing-in-memory request, data elements associated with executing the processing-in-memory request are flushed from a cache system ahead of time for the processing-in-memory request (e.g., before the processing-in-memory request arrives at a cache directory), thus reducing system latency.

Therefore, data elements for both processing-in-memory requests and subsequent processing-in-memory requests that involve that additional memory addresses (e.g., for the other columns within a row) are invalidated locally at a cache system before the memory requests arrive at a cache directory. Consequently, the speculative cache invalidation techniques described herein ensure that data elements involved in processing-in-memory operations are "valid" without encountering the lag and delay involved with the "round trip" of conventional techniques. In this way, the techniques described herein improve operational efficiency, reduce latency, and reduce power consumption. Further discussion of these and other examples is included in the following sections and shown in corresponding figures.

In some aspects, the techniques described herein relate to a system including a cache controller including a cache directory, a processing-in-memory component, and a cache system including a plurality of cache levels, the cache system configured to ensure validity of one or more data elements involved in executing a processing-in-memory request before the processing-in-memory request is dispatched to the cache controller or the processing-in-memory component.

In some aspects, the techniques described herein relate to a system, wherein the cache system is configured to ensure the validity of the one or more data elements by invalidating the one or more data elements from the cache system.

In some aspects, the techniques described herein relate to a system, wherein the cache system is configured to ensure the validity of the one or more data elements by flushing the one or more data elements from the cache system to memory accessible by the processing-in-memory component.

In some aspects, the techniques described herein relate to a system, wherein the cache system ensures the validity of the one or more data elements involved in executing the processing-in-memory request by comparing a memory address for the one or more data elements to a tag table that includes metadata describing data stored in the cache system.

In some aspects, the techniques described herein relate to a system, wherein the processing-in-memory request includes a speculation bit that causes the cache controller to not transmit a cache request to flush the one or more data elements from the cache system upon receiving the processing-in-memory request.

In some aspects, the techniques described herein relate to a system, wherein the cache directory includes a plurality of cache directory entries that indicate memory addresses that are maintained in the cache system.

In some aspects, the techniques described herein relate to a system, wherein the plurality of cache directory entries specify, respectively, a location of respective memory addresses in a plurality of cache levels of the cache system and a status of the respective memory address.

In some aspects, the techniques described herein relate to a system, wherein the cache system is configured to allow transmission of the processing-in-memory request to the cache controller in response to determining that the one or more data elements are valid in memory for use in executing the processing-in-memory request by the processing-in-memory component.

In some aspects, the techniques described herein relate to a system, wherein the cache system is configured to ensure validity of one or more additional data elements involved in executing an additional processing-in-memory request before the additional processing-in-memory request is issued by a processing unit.

In some aspects, the techniques described herein relate to a system, wherein the cache system is configured to select the one or more additional data elements involved in executing the additional processing-in-memory request based on spatial locality relative to the one or more data elements involved in executing the processing-in-memory request.

In some aspects, the techniques described herein relate to a system, further including a processing unit, wherein the processing-in-memory request is received from a core of the processing unit.

In some aspects, the techniques described herein relate to a device including a cache system configured to receive a processing-in-memory request to be executed by a processing-in-memory component, and ensure validity of one or more data elements involved in executing the processing-in-memory request before the processing-in-memory request is transmitted to a memory controller for scheduling execution at the processing-in-memory component.

In some aspects, the techniques described herein relate to a device, wherein the cache system ensures the validity of the one or more data elements involved in executing the processing-in-memory request by invalidating the one or more data elements from the cache system.

In some aspects, the techniques described herein relate to a device, wherein the cache system ensures the validity of the one or more data elements involved in executing the processing-in-memory request by flushing the one or more data elements from the cache system to memory accessible by the processing-in-memory component.

In some aspects, the techniques described herein relate to a device, wherein the cache system ensures the validity of the one or more data elements involved in executing the processing-in-memory request by comparing a memory address for the one or more data elements to a tag table that includes metadata describing data stored in the cache system.

In some aspects, the techniques described herein relate to a device, wherein transmitting the processing-in-memory request includes routing the processing-in-memory request from a processing unit to the memory controller via a cache controller, and wherein the processing-in-memory request includes a speculation bit that causes the cache controller to not transmit a cache request to flush the one or more data elements from the cache system for the processing-in-memory request.

In some aspects, the techniques described herein relate to a device, wherein the cache controller includes a cache directory that includes a plurality of cache directory entries that indicate memory addresses that are maintained in the cache system.

In some aspects, the techniques described herein relate to a device, wherein the cache system is further configured to ensure validity of one or more additional data elements involved in executing an additional processing-in-memory request before the additional processing-in-memory request is issued by a processing unit.

In some aspects, the techniques described herein relate to a device, wherein the one or more additional data elements involved in executing the additional processing-in-memory request are selected based on spatial locality relative to the one or more data elements involved in executing the processing-in-memory request.

In some aspects, the techniques described herein relate to a method including detecting, by a cache system, issuance of a processing-in-memory request from a processing unit core to be executed by a processing-in-memory component, and ensuring validity, by the cache system, of one or more data elements involved in executing the processing-in-memory request by invalidating or flushing the one or more data elements to memory that is accessible by the processing-inmemory component before the processing-in-memory request is dispatched to a cache controller or a memory controller of a device implementing the processing-in-memory component.

FIG. 1 is a block diagram of a non-limiting example system 100 having a device that implements a processing unit and memory module to implement speculative cache invalidation techniques, locally at a cache system, for processing-in-memory instructions. The device 102 includes a processing unit 104 and a memory module 106 communicatively coupled via a bus structure.

The techniques described herein are usable by a wide range of device 102 configurations. Examples of those devices include, by way of example and not limitation, computing devices, servers, mobile devices (e.g., wearables, mobile phones, tablets, laptops), processors (e.g., graphics processing units, central processing units, and accelerators), digital signal processors, machine learning inference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training accelerators, cryptography and compression accelerators, network packet processors, and video coders and decoders.

As depicted in the illustrated example of FIG. 1, the processing unit 104 includes a core 108. The core 108 is an electronic circuit (e.g., implemented as an integrated circuit) that performs various operations on and/or using data in the memory module 106. Examples of processing unit 104 and core 108 configurations include, but are not limited to, a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), examples of which include to add, to move data, and to branch. Although one core 108 is depicted in the illustrated example, in variations, the device 102 includes more than one core 108 (e.g., the device 102 is a multi-core processor). The memory module 106 is implemented as a printed circuit board, on which, memory 116 (e.g., physical memory) and a processing-in-memory component 118 are disposed (e.g., physically and communicatively coupled using one or more sockets).

The processing unit 104 includes a cache system 110 having a plurality of cache levels 112, examples of which are illustrated as a level 1 cache 114(1) through a level "N" cache 114(N). The cache system 110 is configured in hardware (e.g., as an integrated circuit) communicatively disposed between the processing unit 104 and the memory 116 of the memory module 106. The cache system 110 is configurable as integral with the core 108 as part of the processing unit 104, as a dedicated hardware device as part of the processing unit 104, and so forth. Configuration of the cache levels 112 as hardware is utilized to take advantage of a variety of locality factors. Spatial locality is used to improve operation in situations in which data is requested that is stored physically close to data that is a subject of a previous request. Temporal locality is used to address scenarios in which data that has already been requested will be requested again.

In cache operations, a "hit" occurs to a cache level when data that is subject of a load operation is available via the cache level, and a "miss" occurs when the desired data is not available via the cache level. When employing multiple cache levels, requests proceed through successive cache levels 112 until the data is located (e.g., from an L1 cache, to an L2 cache, to an L3 cache, and so forth). The cache system 110 is configurable in a variety of ways (e.g., in hardware) to address a variety of processor unit 104 configurations, such as a central processing unit cache, graphics processing unit cache, parallel processor unit cache, digital signal processor cache, and so forth.

In one or more implementations, the memory module 106 is a circuit board (e.g., a printed circuit board), on which memory 116 (e.g., physical memory such as dynamic random-access memory) is mounted and includes a processing-in-memory component 118 (e.g., implemented in hardware using one or more integrated circuits). In some variations, one or more integrated circuits of the memory 116 are mounted on the circuit board of the memory module 106, and the memory module 106 includes one or more processing-in-memory components 118. Examples of the memory module 106 include, but are not limited to, a TransFlash memory module, a single in-line memory module (SIMM), and a dual in-line memory module (DIMM). In one or more implementations, the memory module 106 is a single integrated circuit device that incorporates the memory 116 and the processing-in-memory component 118 on a single chip. In some examples, the memory module 106 is formed using multiple chips that implement the memory 116 and the processing-in-memory component 118 that are vertically ("3D") stacked together, are placed side-by-side on an interposer or substrate or are assembled via a combination of vertical stacking or side-by-side placement.

The memory 116 is a device or system that is used to store data, such as for immediate use in a device (e.g., by the core 108 and/or by the processing-in-memory component 118). In one or more implementations, the memory 116 corresponds to semiconductor memory where data is stored within memory cells on one or more integrated circuits. In at least one example, the memory 116 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 116 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM).

The processing-in-memory component 118 is implemented in hardware (e.g., as an integrated circuit) configured to perform operations responsive to processing-in-memory instructions (e.g., received from the core 108). The processing-in-memory component 118 is representative of a processor with example processing capabilities ranging from relatively simple (e.g., an adding machine) to relatively complex (e.g., a CPU/GPU compute core). In an example, the processing-in-memory component 118 processes the instructions using data stored in the memory 116.

Processing-in-memory contrasts with standard computer architectures which obtain data from memory, communicate the data to a remote processing unit (e.g., the core 108), and process the data using the remote processing unit (e.g., using the core 108 rather than the processing-in-memory component 118). In various scenarios, the data produced by the remote processing unit as a result of processing the obtained data is written back to memory, which involves communicating the produced data from the remote processing unit to memory.

In terms of data communication pathways, the remote processing unit (e.g., the core 108) is further away from the memory 116 than the processing-in-memory component 118. As a result, these standard computer architectures suffer from increased data transfer latency, reduced data communication bandwidth, and increased data communication energy, particularly when the volume of data transferred between the memory and the remote processing unit is large, which can also decrease overall computer performance. Thus, the processing-in-memory component 118 enables increased computer performance while reducing data transfer energy as compared to standard computer architectures that implement remote processing hardware. Further, the processing-in-memory component 118 alleviates memory performance and energy bottlenecks by moving one or more memory-intensive computations closer to the memory 116.

Although the processing-in-memory component 118 is illustrated as being disposed within the memory module 106 (e.g., within a same integrated circuit or on a same printed circuit board), other examples are also contemplated. The processing-in-memory component 118, for instance, is also configurable to incorporate processing capability near memory modules so that tasks are also processed without costly round-trip transmission to host processors or other distant computing units. Access to the memory module 106 for the processing unit 104 is controlled through use of a memory controller 120.

The memory controller 120 is a digital circuit (e.g., implemented in hardware) that manages the flow of data to and from the memory 116 of the memory module 106. By way of example, the memory controller 120 includes logic to read and write to the memory 116. In one or more implementations, the memory controller 120 also includes logic to read and write to registers (e.g., temporary data storage) maintained by the processing-in-memory component 118, and to interface with the processing-in-memory component 118 (e.g., to provide instructions for processing by the processing-in-memory component 118).

The memory controller 120 also interfaces with the core 108. For instance, the memory controller 120 receives instructions from the core 108, via the cache coherence controller 122. The instructions involve accessing the memory 116 and/or the registers of the processing-in-memory component 118 and provide data to the core 108 (e.g., for processing by the core 108). In one or more implementations, the memory controller 120 is communicatively located between the core 108 and the memory module 106, and the memory controller 120 interfaces with the core 108, the memory module 106, and the cache coherence controller 122.

The core 108 is configured to initiate processing-in-memory (PIM) operations by the processing-in-memory component 118 using processing-in-memory requests that each include one or more processing-in-memory instructions. To ensure that the processing-in-memory component 118 operations on a valid version of data in the memory 116, a cache coherence controller 122 is employed. The cache coherence controller 122 is configurable in hardware (e.g., as one or more integrated circuits), support execution of instructions (e.g., by a microcontroller), and so forth. Validity of the data in the memory 116 refers to a scenario in which a version of data that is to be subject of a processing-in-memory operation is valid (e.g., is accurate in that the data has not been subsequently processed elsewhere) in the processing-in-memory component and the cache system 110. The cache coherence controller 122 is configured to query a cache directory 124 in what is referred to as a "cache directory lookup." The cache directory 124 describes which memory addresses of the memory 116 are maintained in the cache system 110 and a status of data at those memory addresses. A cache directory lookup, for instance, is used to determine whether the data at the memory address is "clean" and unchanged with respect to the data for that memory address maintained in the memory 116 or "dirty" and is changed. Therefore, a cache directory lookup as performed by the cache coherence controller 122 is usable to determine "what" data is stored in the cache system 110 and a status of that data.

Ensuring data validity is performable by the cache coherence controller 122 as a flush in a "dirty" scenario in which the data is caused to be "flushed" from the cache system 110 for storage in the memory 116, which then makes the data stored in the memory 116 valid for a processing-in-memory operation by the processing-in-memory component 118. In a "clean" scenario, the cache coherence controller 122 generates a cache request to cause the cache system 110 to invalidate the clean data in the cache system 110 such that subsequent accesses to the memory address are performed using the memory 116 and not the cache system 110, and as such is also valid for use as part of a processing-in-memory operation in that the accesses are performed to the memory 116 and not the cache system 110. In this manner, subsequent memory requests (e.g., as part of corresponding PIM operations) retrieve the data from memory 116 (e.g., that has been processed as part of the PIM operation) instead of using stale data from the cache system 110.

In conventional systems, processing-in-memory requests issued by the core 108 for execution by the processing-in-memory component 118 bypass the cache system 110 (e.g., due to the processing-in-memory component 118 being unable to directly access data from the cache system 110) and are routed to the cache directory 124. Upon receipt of a processing-in-memory request, the cache directory 124 ensures validity of data elements (e.g., in memory 116) involved in executing the processing-in-memory request. However, such conventional systems inherently induce latency into a pipeline of executing processing-in-memory requests by stalling the processing-in-memory requests at the cache directory 124 while waiting for the cache coherence controller 122 to ensure validity (e.g., via flushing or invalidating) data elements involved in executing the processing-in-memory requests.

To avoid such delays and latency experienced by conventional system architectures, the device 102 is depicted as employing speculative invalidation logic 126. Although depicted in the illustrated example of FIG. 1 as being implemented at the cache system 110 to represent how invalidation and/or flushing of data elements involved in executing a processing-in-memory request is performed locally at the cache system 110, in some implementations the speculative invalidation logic 126 is employed at the core 108. The speculative invalidation logic 126 represents functionality of the device 102 to route a processing-in-memory request from the core 108 to the cache system 110 before forwarding to the cache directory 124.

In implementations, the speculative invalidation logic 126 causes the cache system 110 to query a cache tag table to determine whether one or more data elements involved in executing a processing-in-memory request are stored in one or more cache levels 112 of the cache system 110. In response to detecting that one or more data elements involved in executing the processing-in-memory request are stored in the cache system 110, the cache system 110 generates local invalidations/flushes for the one or more data elements, such that the one or more data elements are "valid" in memory 116 upon arrival of the processing-in-memory request at the cache directory 124.

To further optimize system performance, the speculative invalidation logic 126 further represents functionality (e.g., of the core 108) to configure a processing-in-memory request with a speculation bit that serves as a binary indicator as to whether the processing-in-memory request was first forwarded to the cache system 110 for local invalidation/flushing of data elements. As a specific example, a processing-in-memory request having a speculation bit equal to one "1" indicates that the processing-in-memory request was routed to the cache system 110 for local invalidation/flushing of data before routing to the cache directory 124. Alternatively, a processing-in-memory request having a speculation bit equal to zero "0" indicates that the processing-in-memory request was not first routed to the cache system 110 and that the cache directory 124 thus needs to ensure validity of data elements that may still be cached at the cache system 110. Consequently, in response to receiving a processing-in-memory request having a speculation bit indicating that local invalidation/flushing was performed at the cache system 110, the cache coherence controller 122 avoids generating local invalidations (e.g., avoids transmitting requests to the cache system 110 for the cache system 110 to flush data elements involved in the processing-in-memory request) before dispatching the processing-in-memory request (e.g., to the memory controller 120), and thus avoids the delay associated with stalling the processing-in-memory request at the cache directory 124, as necessitated by conventional systems.

In this way, the techniques described herein improve operational efficiency of the processing-in-memory component 118 to operate on valid data, reduce latency, reduce power consumption, and reduce bottlenecks caused by conventional techniques that stall processing-in-memory requests as a result of the cache directory lookup.

Figure 2:
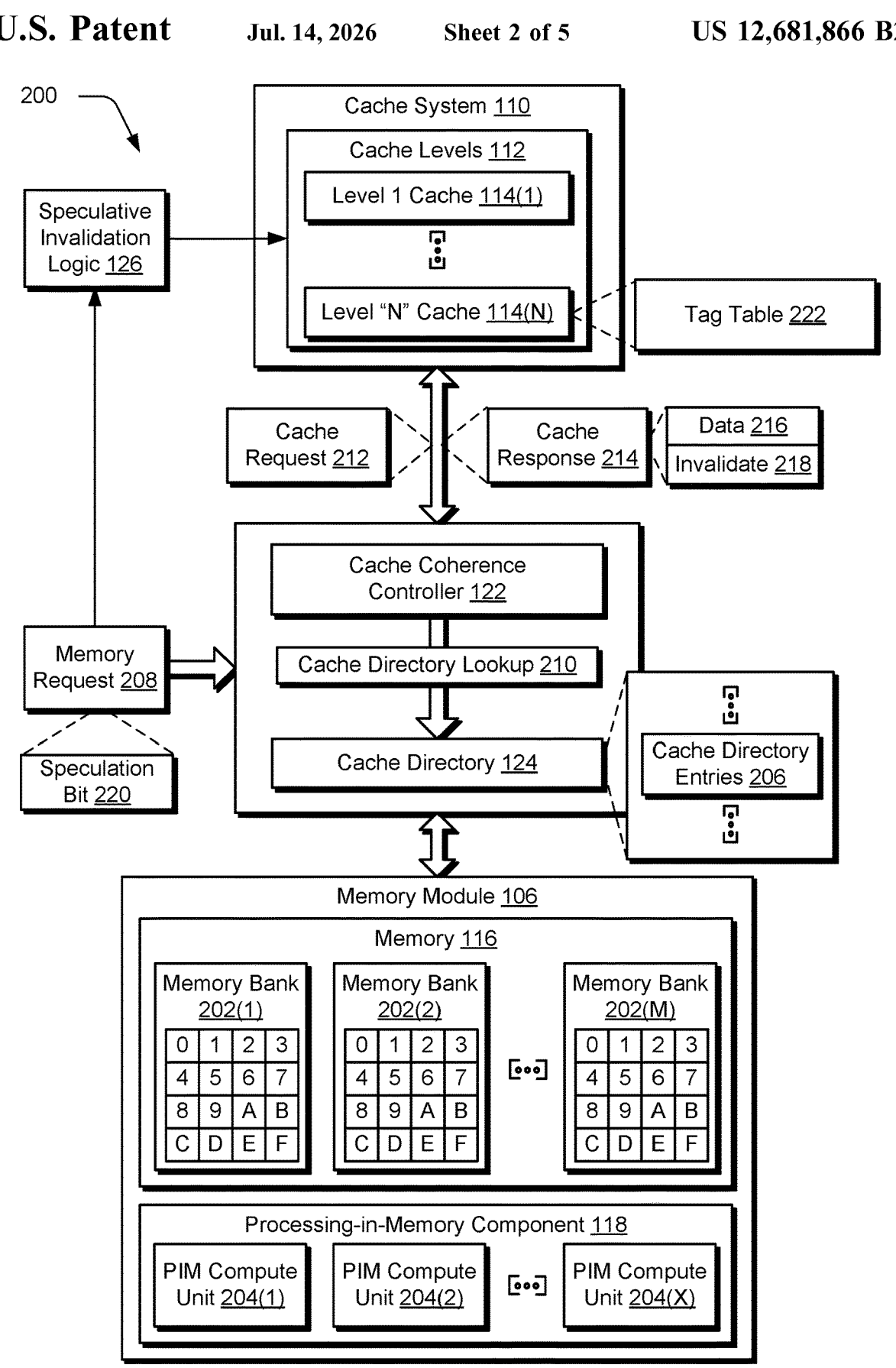
FIG. 2 is a block diagram of a non-limiting example system showing operation of a cache system of FIG. 1 in greater detail as implementing speculative invalidation logic to invalidate data involved with a processing-in-memory instruction before the processing-in-memory instruction arrives at a cache directory.

FIG. 2 is a block diagram of a non-limiting example system 200 showing operation of a cache system 110 of FIG. 1 in greater detail as performing local invalidation/flushing of data elements for a processing-in-memory request before the request arrives at a cache directory based on speculative invalidation logic. In the illustrated example of FIG. 2, the memory 116 is implemented using a plurality of memory banks, examples of which are illustrated as memory bank 202(1), memory bank 202(2), . . . , memory bank 202(M), where M represents any suitable integer (e.g., in one implementations M=16). Likewise, the processing-in-memory component 118 is illustrated as including respective processing-in-memory (PIM) compute units, examples of which are illustrated as PIM compute unit 204(1), PIM compute unit 204(2), . . . , PIM compute unit 204(X), where X represents any suitable integer.

The PIM compute units 204(1)-204(X) are configurable with a variety of processing capabilities in hardware (e.g., using one or more integrated circuits) ranging from relatively simple (e.g., an adding machine) to relatively complex (e.g., a CPU/GPU compute core). The processing unit 104 is configured to offload memory bound computations to the one or more in-memory processors of the processing-in-memory component 118. To do so, the core 108 generates PIM instructions and transmits the PIM instructions, via the memory controller 120, to the memory module 106. The processing-in-memory component 118 receives the PIM instructions and processes the instructions as PIM operations using the PIM compute units 204(1)-204(X) and data stored in the memory 116.

Processing-in-memory using PIM compute units 204(1)-204(X) contrasts with standard computer architectures which obtain data from memory 116, communicate the data to the core 108 of the processing unit 104, and process the data using the core 108 rather than the processing-in-memory component 118. In various scenarios, the data produced by the core 108 as a result of processing the obtained data is written back to the memory 116, which involves communicating the produced data over the pathway from the core 108 to the memory 116. In terms of data communication pathways, the core 108 is further away from the memory 116 than the processing-in-memory component 118. As a result, conventional (e.g., non-processing-in-memory enabled) computer architectures suffer from increased data transfer latency, reduced data communication bandwidth, and increased data communication energy, particularly when the volume of data transferred between the memory 116 and the processing unit 104 is large, which can also decrease overall device 102 performance.

In one or more implementations, the core 108 retrieves data from the memory 116 and stores the data in one or more caches levels 112 of a cache system 110 associated with the core 108. By way of example, the cache levels 112 of the core 108 include a level 1 cache 114(1), . . . , through a level "N" cache 114(N). In implementations in which the core 108 is a multi-core processor, for instance, the cache levels 112 include a level 3 cache is shared by each of the multiple cores 108. Thus, in these implementations, each core 108 of the multi-core processor stores data in a level 1 cache, a level 2 cache, and a shared level 3 cache. In terms of data communication pathways, the cache levels 112 are closer to the core 108 than the memory 116, and as such, data stored in the cache system 110 is accessible in less amount of time by the core 108 than an amount of time taken to access the data stored in the memory 116. It is to be appreciated that the one or more cores 108 of the processing unit 104 are configurable to include cache subsystems with differing numbers of caches and different hierarchical structures without departing from the spirit or scope of the described techniques.

In various examples, the core 108 retrieves a cache line in response to receiving an instruction to access a particular memory address. As used herein, a "cache line" is a unit of data transfer between the memory 116 and the cache system 110. In one example, the cache line is four bytes and the core 108 retrieves a contiguous four-byte block of data from the memory 116 that includes the data of the particular memory address. Further, the core 108 stores the four-byte block of data as a cache line in the cache system 110. If the core 108 receives a subsequent instruction to access a memory address that is a part of the cache line, the core 108 accesses the data of the memory address from the cache system 110, rather than the memory 116.

In one or more examples, the cache system 110 and the memory 116 store different versions of a corresponding cache line. For instance, the core 108 modifies a cache line that is stored in a cache level 112 of the cache system 110, and as such, the data corresponding to the cache line that is stored in the memory 116 is stale and therefore not valid for operations. Accordingly, the cache coherence controller 122 is employed to enforce cache coherence among the cache system 110 and the memory 116. Notably, cache coherence is the uniformity of data that is storable in multiple different memory resources in a system (e.g., the cache system 110 and the memory 116). As part of enforcing cache coherence, the cache coherence controller 122 employs a cache directory 124, which includes cache directory entries 206 for cache lines that are stored in one or more of the cache levels 112 of the cache system 110. In response to cache lines being added to the cache system 110, the cache coherence controller 122 creates cache directory entries 206 in the cache directory 124 that includes a range of memory addresses corresponding to the cache line.

In one example, the cache coherence controller 122 receives a memory request 208 to access data of a memory address from the memory 116. The memory request 208 is representative of a processing-in-memory request, a non-processing-in-memory request, or combinations thereof. In response to receiving the memory request 208, the cache coherence controller 122 performs a cache directory lookup 210 in the cache directory 124. The cache directory lookup 210 is used to determine whether one of the cache directory entries 206 represents a cache line that includes the memory address referenced by the memory request 208.

Based on a result of the cache directory lookup 210, the cache coherence controller 122 performs a corresponding coherence protocol. By way of example, a cache directory 124 miss occurs when the cache directory entries do not include the memory address (e.g., address range) specified by the memory request 208, and therefore the data as maintained for that memory address is valid in memory 116. In contrast, a cache directory 124 hit occurs when there is a cache directory entry 206 included in the cache directory 124 having an address range that includes the memory address of the memory request 208, and therefore the data as maintained for that memory address is not valid in memory 116.

If the cache directory lookup 210 indicates that data specified for a memory address in the memory request 208 is not valid for execution of a processing-in-memory instruction, the cache coherence controller 122 transmits a cache request 212 to the cache system 110. This causes the cache system 110 to transmit a cache response 214 such that the data in the memory 116 is subsequently valid for computation by the processing-in-memory component. This is performable, for instance, by leveraging the cache request to cause the cache system to write the data 216 back to memory (e.g., "flush" the data) and/or invalidate 218 the data in the cache system 110, which is acknowledged by the cache response 214. The cache coherence controller 122 then releases the memory request 208 to the processing-in-memory component 118 for processing (e.g., via a memory controller 120 for performance as part of a processing-in-memory operation).

Thus, the determination of whether a hit "has" or "has not" occurred serves as a basis to determine whether data in the memory specified by the memory request 208 is valid (e.g., for execution of a PIM operation by a respective processing-in-memory component 118). As previously described above, scenarios in which the data is not valid involve additional latency, either to cause the data to be flushed from the cache system 110 to the memory 116 or set to invalidate the data in the cache system 110. This challenge is increased when confronted with parallel execution scenarios.

As illustrated in FIG. 2, the memory 116 includes a plurality of memory banks 202(1)-202(M) that are organized into one or more memory arrays (e.g., grids), which include rows and columns such that data is stored in individual cells of the memory arrays. The memory banks 202(1)-202(M) are representative of a grouping of banks in relation to which the processing-in-memory component 118 is configured to perform various in-memory processing operations. By way of example, PIM compute units 204(1)-204(X) of the processing-in-memory component 118 are included as part of a memory channel along with respective ones of the memory banks 202(1)-202(M). The processing-in-memory component 118, through use of the PIM compute units 204(1)-204(X), performs in-memory processing operations on the data that is stored in the memory banks 202(1)-202(M). In the illustrated example, a plurality of memory channels includes a respective one of the PIM compute units 204(1)-204(X) and a respective one of the memory banks 202(1)-202(M), and a cache coherence controller 122 to enforce cache coherence among the memory banks 202(1)-202(M) within the memory channel and the cache levels 112 of the cache system 110.

The processing-in-memory component 118 is configurable to operate on each of the memory banks 202(1)-202(M) in parallel to execute a single PIM instruction. In the illustrated example, the processing-in-memory component 118 is configured to operate on M memory banks 202(1)-202(M) and receives a PIM instruction to read data from a particular row and column address. To execute the instruction, the processing-in-memory component 118 reads the data of the particular row and column address from each of the memory banks 202(1)-202(M) in parallel.

Therefore, a single PIM instruction of a conventionally configured system triggers a plurality of cache directory lookups 210 in the cache directory 124 (e.g., one lookup for memory addresses in each one of the multiple memory banks 202(1)-202(M)). This is performed to ensure that the requested data stored in each of the memory banks 202(1)-202(M) is "valid" as being coherent with other instances of the requested data stored in the cache system 110.

Continuing with the previous example in which the processing-in-memory component 118 is configured to operate on M memory banks 202(1)-202(M), a standard cache coherence controller 122 performs M cache directory 124 cache directory lookups 210 for a single PIM instruction. A cache directory lookup 210, however, is a computationally expensive task, particularly when a significant number (e.g., sixteen) of cache directory lookups are performed sequentially. Moreover, this significant number of cache directory lookups when performed even for a single PIM instruction often create a bottleneck in the cache directory 124 that affects both PIM workloads and non-PIM workloads. These problems are exacerbated by the notion that PIM instructions are often issued together as a series of sequential PIM instructions, rather than interspersed with non-PIM instructions. Due to this, the number of cache directory lookups to be performed multiplies with each sequential PIM instruction, thereby worsening the bottleneck and increasing cache directory lookup 210 latency and latency of operations that depend on these lookups (e.g., for processing by the processing-in-memory component 118).

To overcome these drawbacks of conventional techniques, speculative invalidation logic 126 is employed to route a processing-in-memory request (e.g., a memory request 208 to be executed by the processing-in-memory component 118) to the cache system 110 before routing to the cache coherence controller 122. The speculative invalidation logic 126 sets a value of a speculation bit 220 for a processing-in-memory request to indicate whether the processing-in-memory request is routed to the cache system 110 before arriving at the cache directory 124. For instance, in implementations where the speculation bit 220 specifies a value of one, the speculation bit 220 informs the cache directory 124 that the PIM request was first routed to the cache system 110 for local invalidation/flushing of data elements involved in executing the PIM request.

In implementations where the speculative invalidation logic 126 routes a processing-in-memory request to the cache system 110, the speculative invalidation logic 126 sets a value of the speculation bit 220 to a predefined value (e.g., one) and causes the cache system 110 to check whether a cache system 110 tag table 222 indicates that one or more data elements involved in executing the PIM request are stored in the cache system 110. As described herein, the tag table 222 represents a portion of memory in the cache system 110 (e.g., a portion of memory in the level "N" cache 114(N) that describes what data elements are stored in the cache levels 112. For instance, the tag table 222 represents metadata describing an address of data as stored in memory 116 and an indication of whether a requested data element is stored in the cache system 110 (e.g., is a cache hit) or not (e.g., is a cache miss). Cache tags in a lower-level cache (e.g., cache 114(N)), as described herein, refer to indications of whether a given data element or set of data elements is associated with a cache hit in the lower-level cache as well as other cache levels 112 in the hierarchy of the cache system 110.

Upon routing of a PIM request (e.g., by the speculative invalidation logic 126) to the cache system 110, the cache system 110 consults tag table 222 to identify whether there is a tag indicating a cache hit for one or more data elements involved in executing the PIM request (e.g., data 216), before the PIM request is sent to the cache coherence controller 122. In response to identifying a cache hit based on the tag table 222, an invalidation 218 for the requested data is generated locally at the cache system, which causes the requested data element(s) to be invalidated or flushed to memory 116 before the PIM request arrives at the cache directory 124 (e.g., before forwarding to the memory controller 120 for scheduling execution of the PIM request by the processing-in-memory component 118).

In addition to causing local invalidation/flushing (e.g., triggering invalidation/flushing at the cache system 110) of data elements involved in executing a PIM request having a speculation bit 220 set to a predefined value (e.g., one), in some implementations the speculative invalidation logic 126 causes the cache system 110 to invalidate/flush one or more additional data elements that are not involved in executing the PIM request. For instance, in such implementations where additional data elements are invalidated/flushed locally at the cache system 110, the speculative invalidation logic 126 identifies that there is a high probability that one or more subsequent PIM requests involve the additional data elements, due to memory layout configurations. A single PIM operation, for instance, is configurable to execute a same operation (i.e., instruction) at a row and column specified in a memory request for each of a plurality of memory banks in memory. To reduce an overhead of opening new rows in memory, PIM operations are configurable to leverage spatial locality and issue a subsequent memory request to the same rows. Techniques used to perform memory address interleaving, for instance, are usable to place multiple blocks of adjacent data in a same row in memory. Typically, PIM operations are employed in real-world scenarios for large data structures that cover entire rows in the memory banks, and potentially several rows. Therefore, if a PIM operation operates using a particular row and column in a memory bank, a subsequent PIM operation is likely to involve access to other columns in the same row activations.

In this manner, in certain situations the speculative invalidation logic 126 proactively causes the cache system 110 to flush and/or invalidate additional data elements to improve performance of the device 102 (e.g., by avoiding the latency associated with stalling one or more subsequent PIM requests at the cache directory 124 while waiting for the cache coherence controller 122 to ensure validity of the additional data elements in memory 116). Thus, when the speculative invalidation logic 126 is triggered for a PIM request, the speculative invalidation logic 126 causes the cache system 110 to proactively flush and/or invalidate data elements involved in executing the PIM request. Upon receiving a PIM request with a speculation bit 220 indicating that the cache system 110 locally performed invalidation/flushing of data elements involved in executing the PIM request, the cache directory 124 avoids performing cache directory lookups 210 for data elements involved in executing the PIM request, thus avoiding computational delays and energy consumption requirements of conventional systems.

Figure 3:
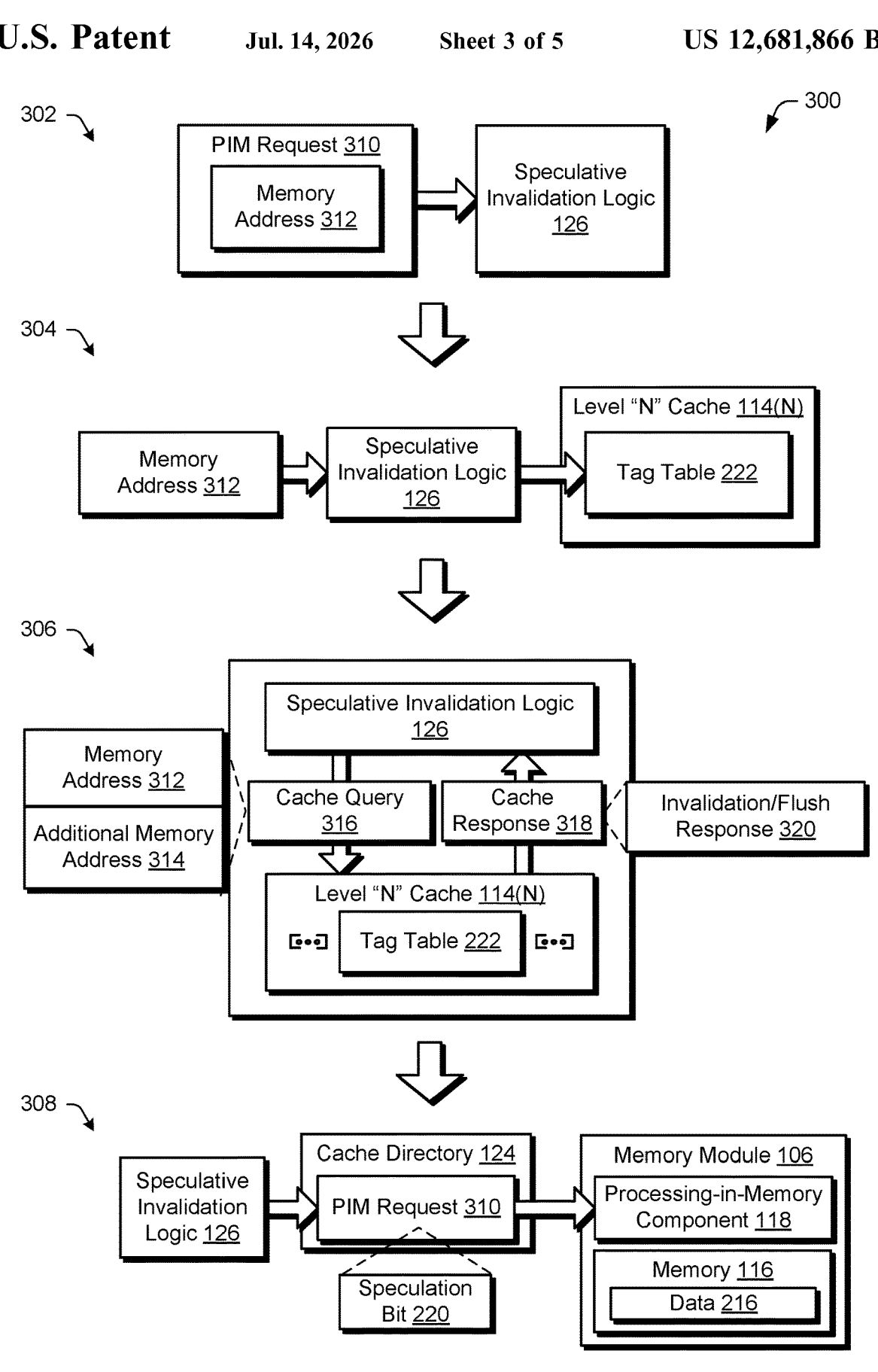
FIG. 3 is a block diagram of a non-limiting example system illustrated using first, second, third, and fourth stages as showing receipt of a memory request specifying a memory address, querying a tag table maintained at a cache system for the memory address, querying the tag table for an additional memory address based on the memory address, and forwarding the memory request to a cache directory after invalidating data at the cache system.

In the following discussion, operation of the example system depicted in FIG. 3 is described in parallel to the procedures depicted in FIGS. 4 and 5. FIG. 4 is a block diagram of a non-limiting example procedure 400 describing performance of a speculative cache invalidation for a processing-in-memory request. FIG. 5 is a block diagram of a non-limiting example procedure 500 describing performance of a cache directory dispatching a processing-in-memory request based on an indication of whether a speculative cache invalidation is performed for the processing-in-memory request.

FIG. 3 is a block diagram of a non-limiting example system 300 illustrated using a first stage 302, a second stage 304, a third stage 306, and a fourth stage 308 as showing receipt of a memory request specifying a memory address, querying a tag table maintained at a cache system for the memory address, querying the tag table for an additional memory address based on the memory address, and forwarding the memory request to a cache directory after flushing and/or invalidating data at the cache system.

At the first stage 302, a processing-in-memory request 310 that includes at least one memory address 312 is received (block 402; block 502) and processed by a device component implementing the speculative invalidation logic 126. The processing-in-memory request 310, for instance, originates through software execution (e.g., an application, operating system) at the core 108 and is received at the cache system 110 via a communicative coupling (e.g., a bus structure, a network-on-chip, or the like).

At the second stage 304, a lookup is performed in a cache tag table 222 based on the memory address 312 (block 404). The speculative invalidation logic 126 causes the cache system 110 to consult a tag table 222 maintained in a level "N" cache 114(N) of the cache system 110 to determine whether the at least one memory address 312 for data element(s) involved in executing the processing-in-memory request 310 is stored in the cache system 110.

At the third stage 306, an additional memory address 314 is selected based on the at least one memory address 312. In an example, the speculative invalidation logic 126 identifies the additional memory address 314 based on the at least one memory address 312. Spatial locality is used in one example to select the additional memory address 314 as being stored physically close to the memory address 312. Temporal locality is used in another example to address scenarios in which an additional memory address 314 which was already requested and a likelihood that the additional memory address 314 will be requested again (e.g., as associated with the memory address 312).

As depicted in the third stage 306, the speculative invalidation logic 126 causes the cache system 110 to locally generate a cache query 316 for data elements associated with the at least one memory address 312, and optionally the additional memory address 314. The cache query 316 involves checking the tag table 222 to determine whether any of the cache levels 112 are identified as storing the data elements associated with the at least one memory address 312, and optionally the additional memory address 314. A cache response 318 is generated by the cache system 110 based on the cache query 316, which is representative of an indication that the cache system 110 does not include data elements associated with the at least one memory address 312 or the additional memory address 314 (e.g., that the memory addresses are "clean") or that the cache system 110 includes data elements associated with the at least one memory address 312 or the additional memory address 314 (e.g., that the memory addresses are "dirty").

In implementations where the cache response 318 indicates that the at least one memory address 312 and/or the additional memory address 314 are "dirty," an invalidation is locally generated at the cache system 110 (block 406), which is represented in the illustrated example of FIG. 3 by the invalidation/flush response 320. As described herein, the invalidation/flush response 320 is representative of the cache system 110 locally generating invalidations for data elements associated with the at least one memory address 312 or the additional memory address 314, flushing the data elements from the cache system 110 to memory 116, or combinations thereof.

As depicted in the fourth stage 308, after receiving a cache response 318 that indicates the at least one memory address 312 and the additional memory address 314 are clean, or receiving confirmation that an invalidation/flush response 320 is issued and successfully completed in response to the cache query 316, the speculative invalidation logic 126 forwards the processing-in-memory request 310 to the cache directory 124 (block 408). The cache directory 124 then forwards the processing-in-memory request 310 to the processing-in-memory component 118 and the processing-in-memory component 118 executes the processing-in-memory request 310 (block 410). In some implementations, the speculative invalidation logic 126 does not wait for the cache response 318 before forwarding the processing-in-memory request 310 to the cache directory 124. In this manner the operations of block 406 and block 408 are configured to be performed in parallel with one another.

In some implementations, functionality performed by the cache directory 124 in forwarding the processing-in-memory request 310 to the processing-in-memory component 118 depends on a value of a speculation bit 220 included in the processing-in-memory request 310. For instance, in some implementations the speculative invalidation logic 126 forwards the processing-in-memory request 310 to the cache directory 124 with an indication of the cache response 318 and the cache directory 124 determines whether the at least one memory address 312 for the processing-in-memory request 310 is cached (block 504). In implementations where the cache response 318 for the processing-in-memory request 310 indicates that the at least one memory address 312 is cached (e.g., a "Yes" determination at block 504), the cache directory 124 dispatches the processing-in-memory request 310 to the processing-in-memory component 118 for execution using data 216 (e.g., data elements represented by the at least one memory address 312) in memory 116 (block 506).

Alternatively, in implementations where the cache response 318 for the processing-in-memory request 310 does not indicate that the at least one memory address 312 is cached (e.g., a "No" determination at block 504), functionality of the cache directory 124 depends on a determination as to whether the speculation bit 220 for the processing-in-memory request 310 is set (block 508). In response to determining that the speculation bit 220 is set (e.g., a "Yes" determination at block 508 indicating that the cache system 110 previously generated an invalidation/flush response 320 for the at least one memory address 312 and/or the additional memory address 314), the cache directory 124 optionally generates remote cache invalidations for the at least one memory address 312 (block 510).

Performance of generating the remote cache invalidations for the at least one memory address 312 is optional, and performed by the cache directory 124 in situations where the data 216 may be stored in a cache other than the cache system 110 (e.g., in a multi-core situation where a core of the processing unit 104 that the cache system 110 is not covering may be storing a copy of the data elements involved in executing the processing-in-memory request 310). In system architectures where the data 216 may be stored in a cache other than the cache system 110, the cache coherence controller 122 transmits a cache request 212 to the remote cache system and waits for a cache response 214 from the remote cache system indicating that the requested data elements have been invalidated or flushed. In response to detecting the remote cache invalidation response(s) (block 510), the cache directory 124 identifies that the data involved in executing the processing-in-memory request 310 is clean and dispatches the processing-in-memory request 310 to the processing-in-memory component 118 for execution, as indicated by the arrow connecting block 510 to block 512.

Alternatively, in response to determining that the speculation bit 220 is not set (e.g., a "No" determination at block 508 indicating that the cache system 110 did not previously generate an invalidation/flush response 320 for the at least one memory address 312 and/or the additional memory address 314), the cache directory 124 generates local cache invalidations for the at least one memory address 312 (block 514). The cache directory 124, for instance, transmits a cache request 212 for the at least one memory address 312 to the cache system 110. In response to detecting local cache invalidation response(s) from the cache system 110 (block 516), the cache directory 124 identifies that the data involved in executing the processing-in-memory request 310 is clean and dispatches the processing-in-memory request 310 to the processing-in-memory component 118 for execution, as indicated by the arrow connecting block 516 to block 512. In implementations where a system architecture includes one or more caches remote from the cache system 110 that may store data 216 involved in executing the processing-in-memory request 310, a "No" determination at block 508 also proceeds through operations represented at block 510 and block 512, as described above, before the processing-in-memory request 310 is dispatched to the processing-in-memory component 118. In this manner, the speculative invalidation logic 126 enables execution of the processing-in-memory request 310 (and optionally one or more additional PIM requests that involve the additional memory address 314) with increased efficiency and reduced power consumption compared to when a cache directory lookup is involved, as required by conventional systems.

Many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102 having the core 108 and the memory module 106 having the memory 116 and the processing-in-memory component 118) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
a cache controller including a cache directory;
a processing-in-memory component; and
a cache system including a plurality of cache levels, the cache system configured to:
    ensure validity, using a tag table maintained in one of the plurality of cache levels, of one or more data elements involved in executing a processing-in-memory request before the processing-in-memory request is dispatched to the cache controller or the processing-in-memory component; and
    cause the cache controller to skip performing a lookup for the processing-in-memory request using the cache directory responsive to ensuring validity of the one or more data elements using the tag table.

2. The system of claim 1, wherein the cache system is configured to ensure the validity of the one or more data elements by invalidating the one or more data elements from the cache system.

3. The system of claim 1, wherein the cache system is configured to ensure the validity of the one or more data elements by flushing the one or more data elements from the cache system to memory accessible by the processing-in-memory component.

4. The system of claim 1, wherein the cache system ensures the validity of the one or more data elements involved in executing the processing-in-memory request by comparing a memory address for the one or more data elements to the tag table, wherein the tag table includes metadata describing data stored in the cache system.

5. The system of claim 1, wherein the processing-in-memory request includes a speculation bit that causes the cache controller to not transmit a cache request to flush the one or more data elements from the cache system upon receiving the processing-in-memory request.

6. The system of claim 1, wherein the cache directory includes a plurality of cache directory entries that indicate memory addresses that are maintained in the cache system.

7. The system of claim 6, wherein the plurality of cache directory entries specify, respectively, a location of respective memory addresses in a plurality of cache levels of the cache system and a status of the respective memory address.

8. The system of claim 1, wherein the cache system is configured to allow transmission of the processing-in-memory request to the cache controller in response to determining that the one or more data elements are valid in memory for use in executing the processing-in-memory request by the processing-in-memory component.

9. The system of claim 1, wherein the cache system is configured to ensure validity of one or more additional data elements involved in executing an additional processing-in-memory request before the additional processing-in-memory request is issued by a processing unit.

10. The system of claim 9, wherein the cache system is configured to select the one or more additional data elements involved in executing the additional processing-in-memory request based on spatial locality relative to the one or more data elements involved in executing the processing-in-memory request.

11. A device comprising:
a cache system comprising a plurality of cache levels and configured to:
    receive a processing-in-memory request to be executed by a processing-in-memory component;
    ensure validity, using a tag table maintained in one of the plurality of cache levels, of one or more data elements involved in executing the processing-in-memory request before the processing-in-memory request is transmitted to a memory controller for scheduling execution at the processing-in-memory component; and
    responsive to ensuring validity of the one or more data elements using the tag table maintained in the one of the plurality of cache levels, cause a cache controller coupled to the device to skip performing a lookup for the processing-in-memory request using a cache directory.

12. The device of claim 11, wherein the cache system ensures the validity of the one or more data elements involved in executing the processing-in-memory request by invalidating the one or more data elements from the cache system.

13. The device of claim 11, wherein the cache system ensures the validity of the one or more data elements involved in executing the processing-in-memory request by flushing the one or more data elements from the cache system to memory accessible by the processing-in-memory component.

14. The device of claim 11, wherein the cache system ensures the validity of the one or more data elements involved in executing the processing-in-memory request by comparing a memory address for the one or more data elements to the tag table, wherein the tag table includes metadata describing data stored in the cache system.

15. The device of claim 11, wherein transmitting the processing-in-memory request comprises routing the processing-in-memory request from a processing unit to the memory controller via the cache controller, and wherein the processing-in-memory request includes a speculation bit that causes the cache controller to not perform the lookup for the processing-in-memory request using the cache directory.

16. The device of claim 15, wherein the cache controller comprises a cache directory that includes a plurality of cache directory entries that indicate memory addresses that are maintained in the cache system.

17. The device of claim 11, wherein the cache system is further configured to ensure validity of one or more additional data elements involved in executing an additional processing-in-memory request before the additional processing-in-memory request is issued by a processing unit.

18. The device of claim 17, wherein the one or more additional data elements involved in executing the additional processing-in-memory request are selected based on spatial locality relative to the one or more data elements involved in executing the processing-in-memory request.

19. A method comprising:

detecting, by a cache system comprising a plurality of cache levels, issuance of a processing-in-memory request from a processing unit core to be executed by a processing-in-memory component;

ensuring validity, by the cache system using a tag table maintained in one of the plurality of cache levels, of one or more data elements involved in executing the processing-in-memory request by invalidating or flushing the one or more data elements to memory that is accessible by the processing-in-memory component before the processing-in-memory request is dispatched to a cache controller or a memory controller of a device implementing the processing-in-memory component; and responsive to ensuring validity of the one or more data elements using the tag table maintained in the one of the plurality of cache levels, causing the cache controller to skip performing a lookup for the processing-in-memory request using a cache directory.

20. The method of claim 19, wherein the plurality of cache levels are arranged in a cache hierarchy from a highest-level cache to a lowest-level cache, wherein the tag table is maintained in the lowest-level cache.

* * * * *